(12) United States Patent
Holma et al.

(10) Patent No.: US 6,507,570 B1
(45) Date of Patent: Jan. 14, 2003

(54) INTERFREQUENCY MEASUREMENT

(75) Inventors: Harri Holma, Espoo (FI); Antti Toskala, Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/312,179

(22) Filed: May 14, 1999

(30) Foreign Application Priority Data

May 15, 1998 (GB) .............................. 9810402

(51) Int. Cl.$^7$ ................................ H04G 7/00
(52) U.S. Cl. ...................... 370/333; 370/329; 370/318; 455/24; 455/135
(58) Field of Search ................................ 370/330, 332, 370/333, 335, 342, 328, 329, 318; 455/436, 437, 438, 444, 447, 24, 525, 134, 135; 714/704

(56) References Cited

U.S. PATENT DOCUMENTS

| | | | |
|---|---|---|---|
| 5,257,257 A | 10/1993 | Chen et al. ................... 370/18 |
| 5,339,330 A | * 8/1994 | Mallinckrodt ............... 370/320 |
| 5,345,448 A | 9/1994 | Keskitalo ................... 370/95.3 |
| 5,392,453 A | * 2/1995 | Gudmundson et al. ..... 455/444 |
| 5,394,391 A | 2/1995 | Chen et al. ................... 370/18 |
| 5,410,733 A | 4/1995 | Niva et al. ................. 455/33.2 |
| 5,416,435 A | 5/1995 | Jokinen et al. ............. 327/113 |
| 5,420,889 A | 5/1995 | Juntti ........................ 375/346 |
| 5,426,670 A | 6/1995 | Leppanen et al. .......... 375/343 |
| 5,440,597 A | 8/1995 | Chung et al. ............... 375/200 |
| 5,446,756 A | * 8/1995 | Mallinckrodt ............... 375/130 |
| 5,483,668 A | 1/1996 | Malkamaki et al. ....... 455/33.2 |
| 5,491,718 A | 2/1996 | Gould et al. ................ 375/205 |
| 5,524,009 A | 6/1996 | Tuutijarvi et al. ......... 370/95.3 |
| 5,533,013 A | 7/1996 | Leppanen ................... 370/18 |
| 5,548,616 A | 8/1996 | Mucke et al. ............... 375/295 |
| 5,550,893 A | 8/1996 | Heidari ........................ 379/59 |
| 5,566,201 A | 10/1996 | Ostman ...................... 375/200 |
| 5,589,795 A | 12/1996 | Latva-Aho ................. 327/553 |
| 5,590,160 A | 12/1996 | Ostman ...................... 375/367 |
| 5,596,571 A | 1/1997 | Gould et al. ................ 370/335 |
| 5,654,980 A | 8/1997 | Latva-aho et al. .......... 375/208 |
| 5,659,598 A | 8/1997 | Byrne et al. ................ 455/436 |
| 5,703,873 A | 12/1997 | Ojanpera et al. ........... 370/332 |
| 5,710,974 A | 1/1998 | Granlund et al. .......... 455/33.2 |
| 5,715,279 A | 2/1998 | Laakso et al. .............. 375/224 |

(List continued on next page.)

FOREIGN PATENT DOCUMENTS

| | | |
|---|---|---|
| GB | 2 246 490 A | 1/1992 |
| GB | 2 314 737 A | 1/1998 |
| GB | 2 321 370 A | 7/1998 |

OTHER PUBLICATIONS

Finnish Patent Application No. 972299 (and English Translation thereof).
Chapter 8 "Block and Convolutional Channel Codes" of Digital Communication by John Proakis.
United Kingdom Search Report.

Primary Examiner—Dwayne Bost
Assistant Examiner—Sonny Trinh
(74) Attorney, Agent, or Firm—Perman & Green, LLP

(57) ABSTRACT

A radio telephone for communicating in a spreadspectrum communication system having a plurality of radio channels of different frequencies; the radio telephone comprising communication means for establishing over one of said radio channels a communication link over which is communicated data and associated error correction data; a receiver operable to alternatively receive for a period a radio channel other than the established channel and processing means for measuring the radio signal characteristics of the other channel; the processing means being operable to use error correction data received over the established communication link to calculate the contents of the established communication link data of the radio channel signal during the period.

12 Claims, 4 Drawing Sheets

U.S. PATENT DOCUMENTS

| | | | |
|---|---|---|---|
| 5,774,809 A | | 6/1998 | Tuutijarvi et al. .......... 455/437 |
| 5,796,776 A | * | 8/1998 | Lomp et al. ................. 375/140 |
| 5,809,399 A | | 9/1998 | Tuutijarvi et al. ............ 455/63 |
| 5,815,801 A | | 9/1998 | Hamalainen et al. ......... 455/63 |
| 5,845,192 A | | 12/1998 | Saunders ................... 455/11.1 |
| 5,864,759 A | | 1/1999 | Tat ............................. 455/437 |
| 5,870,675 A | | 2/1999 | Tuutijarvi et al. .......... 455/436 |
| 5,881,097 A | | 3/1999 | Lilleberg et al. ............ 375/203 |
| 5,887,252 A | | 3/1999 | Noneman ................... 455/414 |
| 5,896,373 A | | 4/1999 | Mitts et al. ................. 370/331 |
| 5,896,570 A | | 4/1999 | Saunders et al. ........... 455/437 |
| 6,021,123 A | * | 2/2000 | Mimura ...................... 370/331 |
| 6,094,427 A | * | 7/2000 | Yi ............................... 370/331 |
| 6,181,943 B1 | * | 1/2001 | Kuo et al. ................... 455/437 |

* cited by examiner

INTERFREQUENCY MEASUREMENT

FIELD OF THE INVENTION

The present invention relates to an apparatus and method for inter-frequency measurement in a spread spectrum communication system.

DESCRIPTION OF THE PRIOR ART

Wireless communication systems allow a communication link to be established between two or more users without the need for a wired infrastructure to connect these users. This form of communication has increased in popularity over the last few years. However, the frequency spectrum available for wireless communication is a limited resource potentially limiting the use of wireless communication in the long term. To maximise this resource different technologies and techniques have been developed. Cellular radio systems are one example of these technologies where the current systems use at least one of three protocols; frequency division multiple access (FDMA), time division multiple access (TDMA) and code division multiple access (CDMA).

CDMA has recently attracted considerable interest where multiple communication links can be established over one broad frequency spectrum. Each communication link is assigned a unique spreading code. This allows multiple users to communicate over the same wideband frequency spectrum.

Therefore, in a CDMA communication system a single wideband radio frequency can be assigned to each of the cellular areas that form the communication system, where a plurality of unique spectrum spreading codes are assigned to each area. As such, the number of users that can be multiplexed together is mainly limited by the amount of interference generated by transmissions rather than the radio frequency channels available.

However, there are occasions when more than one wideband radio channel is required in a CDMA cellular system. For example, different operators may assign different frequency bands or an operator may have a plurality of wideband radio channels of different frequencies to support different traffic volumes for different areas. City centres are likely to have a greater number of users than rural areas. To accommodate this larger number more than one wideband CDMA channel may be assigned, where each CDMA channel has it own set of unique codes. FIG. 1 shows four radio zones a to d where zone a is supported by two channels, zone b by three channels, zone c by two channels and zone d by one channel. The number of channels assigned is dependent on the traffic volume for each area.

Therefore, in a CDMA communication system a radio telephone having established a communication link over a particular channel may require to be reassigned to a new channel if the radio telephone moves from one zone to another.

A further example of a hierarchical cell is shown in FIG. 2 which comprises a macro cell 16 with a base station 17 operating at one frequency incorporating a micro cell 18 with a base station 19 operating at a different frequency to that of base station 17. The micro cell may, for example, be an office CDMA communication network. In this example if radio telephone 20 has established a communication link with base station 17 the radio telephone 20 may need to perform an inter-frequency measurement to determine whether a handover to base station 19 should be performed.

A radiotelephone will typically establish a connection with a base station based on signal strength. However, other criteria may be used, for example the cost of the service provided by the different cells.

Once a communication link has been established in a CDMA system between a radio telephone and a base station there is typically a continuous downlink from the base station to the radio telephone. Therefore, if a radio telephone is to perform an inter-frequency measurement the radio telephone receiver will require to be tuned to another frequency potentially resulting in loss of data. This may be unacceptable to the user. One approach to over come this problem has been to use a dual receiver where one receiver is used to perform an inter-frequency measurement while the other receiver is used for receiving data from the established communication link. This approach is disclosed in Finnish patent application 972299. However, a radio telephone may not have two or more receivers or the radio telephone may only be able to use the second receiver for diversity measurement.

SUMMARY OF THE INVENTION

In accordance with one aspect of the present invention there is provided a radio telephone for communicating in a spreadspectrum communication system having a plurality of radio channels of different frequencies; the radio telephone comprising communication means for establishing over one of said radio channels a communication link over which is communicated data and associated error correction data; a receiver operable to alternatively receive for a period a radio channel other than the established channel and processing means for measuring the radio signal characteristics of the other channel; the processing means being operable to use error correction data received over the established communication link to calculate the contents of the established communication link data of the radio channel signal during the period.

This invention allows the radio telephone to perform inter-frequency measurements without extra inter-frequency signalling between the base station and the radiotelephone.

This invention allows the radio telephone to perform inter-frequency measurements without the base station needing to know when the inter-frequency measurement is being performed.

Preferably the processing means measures the received signal strength.

Most preferably the communication means is responsive to a control signal from the processing means for requesting the communication system to increase power a predetermined interval before the receiver receives the other radio channel.

Preferably if the signal characteristics of the other radio channel complies with at least one predetermined criterion a communication link over the other radio channel is established.

In accordance with a second aspect of the present invention there is provided a method of measuring a radio channel in a spreadspectrum communication system having a plurality of radio channels of different frequencies; the method comprising establishing a communication link over one of said radio channels over which is communicated data and associated error correction data alternatively receiving for a period a radio channel other than the established channel and measuring the radio characteristics of the other channel using error correction data received over the established communication link to calculate the contents of the established communication link data of the radio channel signal during the period.

Preferably the received signal strength is measured.

Most preferably the communication system is requested to increase power a predetermined interval before receiving the other radio channel.

BRIEF DESCRIPTION OF THE DRAWINGS

An example of a method and apparatus according to the invention will now be described with reference to the accompanying drawings, in which.

DETAILED DESCRIPTION OF THE INVENTION

The following example is based on communication within a spread spectrum communication system where the communication system is more specifically based on a direct sequence code division multiple access (DS-CDMA) communication system. In contrast to FDMA and TDMA, CDMA works by spreading all signals across the same broad frequency spectrum and assigning a unique code to each communication link established over the frequency spectrum. Therefore, all calls are transmitted over the same frequency spectrum where each call is separated by a unique code. For example, in the IS-95 CDMA communication system a CDMA channel is 1.25 MHz wide and each user is designated a unique code, this typically allows five to ten users to communicate on this channel simultaneously. In highly populated areas one CDMA channel is unlikely to provided sufficient bandwidth to support all users. Therefore, a radio zone may have two or more CDMA channels depending on the number of subscribers (i.e. traffic volumes).

Figure 1:
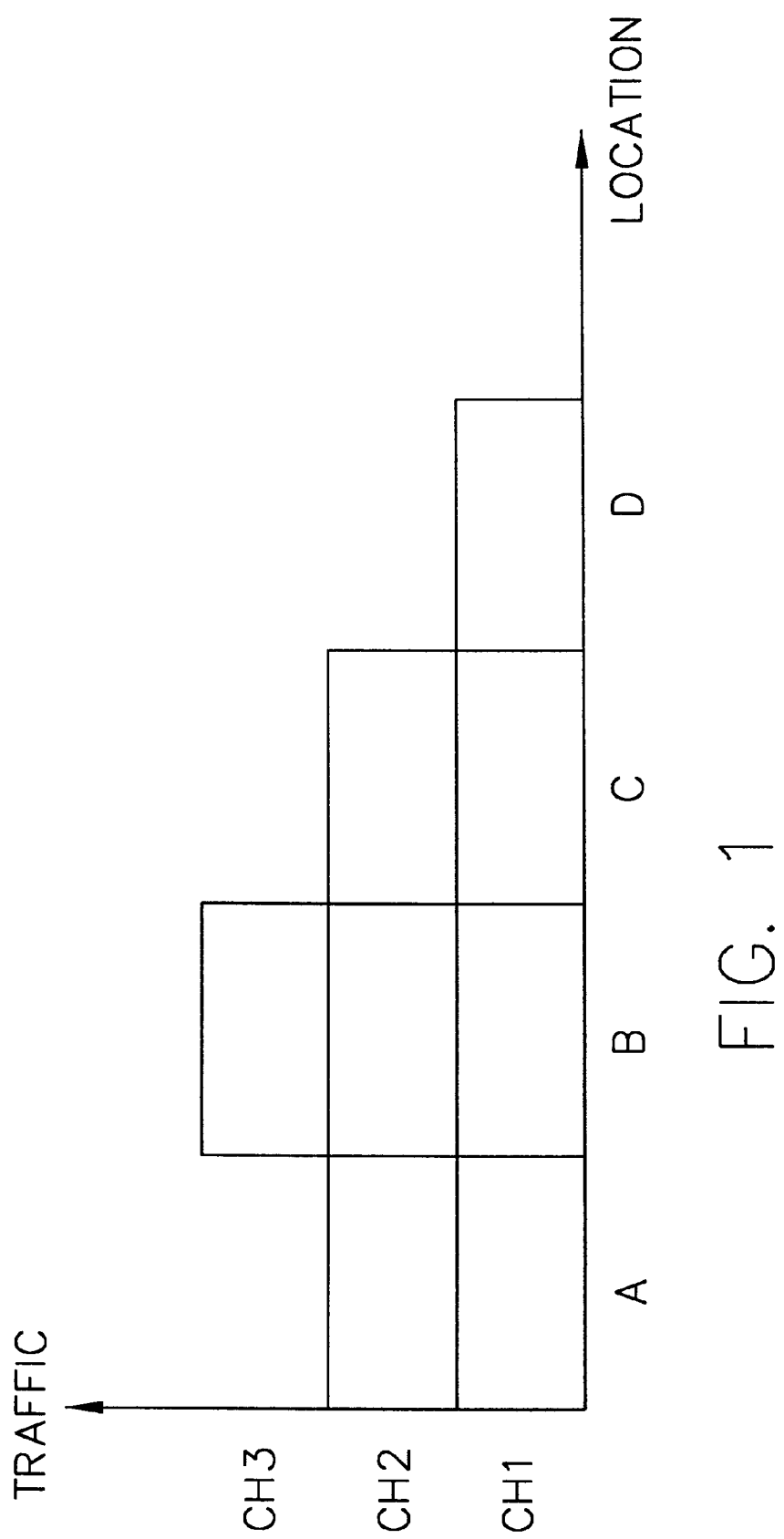
FIG. 1 is a diagram of a zone structure of the cellular communication system.
Figure 2:
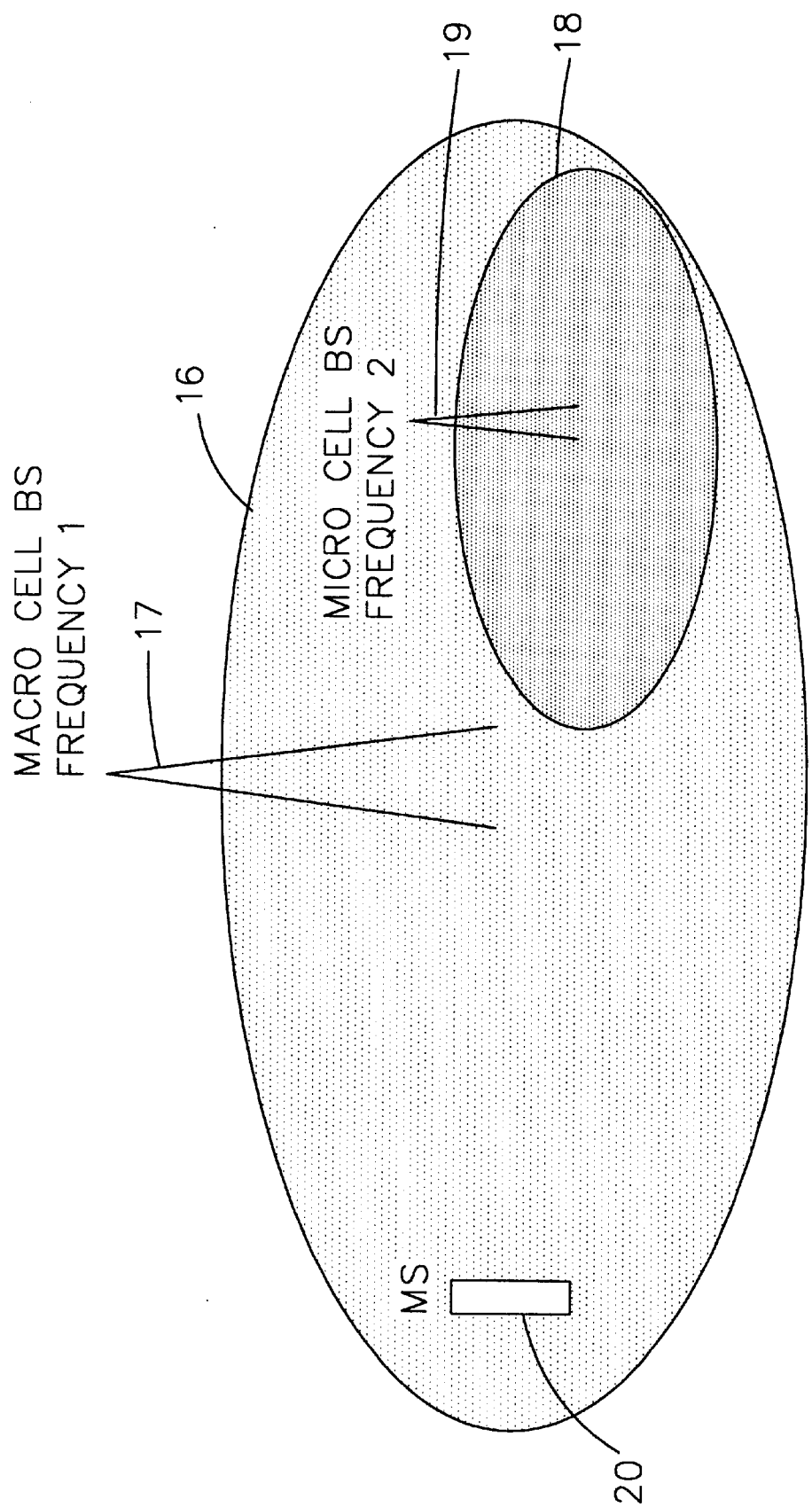
FIG. 2 illustrates a macro/micro cell hierarchical CDMA communication system.

FIG. 1 shows an example of an assignment of radio channels for four radio zones where the traffic volumes for each zone differ. The radio zones are each assigned radio channels having different frequencies where the number of channels assigned corresponds to the traffic volume for each zone. That is to say, as radio zone b has the greatest traffic three CDMA channels have been assigned, whereas for radio zone d only one CDMA channel has been assigned. Radio zones a and c have two CDMA channels assigned to both.

Figure 3:
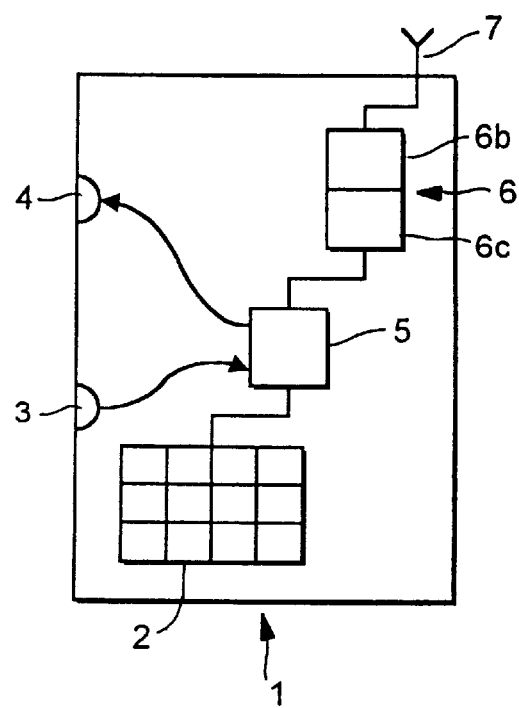
FIG. 3 is a schematic diagram of a CDMA communication system according to the present invention.
Figure 3:

FIG. 3 shows a CDMA communication system having two base stations 8, 12 and a radiotelephone 1.

In more detail, the base station 8 has an antenna 11, a transceiver 10 and a processor 9. The processor 9 controls the operation of the base station. The processor 9 can control communications by the transceiver 10 so as to transmit signals to and to receive signals from the radiotelephone 1. The transceiver 10 converts audio and/or data to a radio signal and a radio signal into audio and/or data where the transceiver 10 operates at specific frequencies. The antenna converts RF energy to and from electromagnetic waves. The base station 12 has an antenna 15, a transceiver 14 and a processor 13; where these elements perform the same function as the corresponding elements for base station 8.

The radio telephone 1 has an antenna 7, a transceiver 6, a processor 5, a microphone 3, a keypad and a speaker 4. The processor 5 can control the transceiver 6 to transmit and receive signals and can route communications between the microphone 3, the speaker 4 and the transceiver 6. A keypad 2 is provided to allow a user of the radio telephone to make and answer calls. This overall architecture is conventional.

The transceiver 6 comprises a transmitter 6a, a receiver 6b and a signal measuring device 6c.

The receiver 6b may comprise two or more receivers to support diversity measurement, however this is not required for this invention.

The base stations 8, 12 constantly transmits signals which the radiotelephone 1 can use to synchronise to the network for the purposes of receiving or transmitting a call.

This description makes use of the following terms, CDMA channel, CDMA traffic channel and CDMA control channel. In this description a CDMA channel is the broadband communication channel over which multiple connections are established. A CDMA traffic channel is a communication link established over the CDMA channel that is distinguished from other CDMA traffic channels, and control channels, by means of a unique code. A CDMA control channel is a communication link established over the CDMA channel that is distinguished from other CDMA control channels, and traffic channels, by means of a unique code.

A typical wide-band CDMA telecommunications network will have a Common Control Physical Channel (CCPCH), a Physical Random Access Channel (PRACH), a Synchronization Channel (SCH) and a Physical Data Channel (PDCH). Each channel is arranged into slots, where 16 slots form a 10 ms frame.

The CCPCH incorporates the Broadcast Control Channel (BCCH) the Forward Access Channel (FACH) and the Paging Channel (PCH). The BCCH is a downlink point to multipoint channel containing broadcast system and cell specific information. The FACH is a downlink channel for carrying control information to a radio telephone when the network knows the location cell of the radio telephone. The PCH is a downlink channel for carrying control information to a radio telephone when the network does not know the location of the radio telephone.

The PRACH is an uplink channel used for carrying control information from the radio telephone to the network.

The SCH is a downlink signal used by a radio telephone for cell searching.

Figure 4:
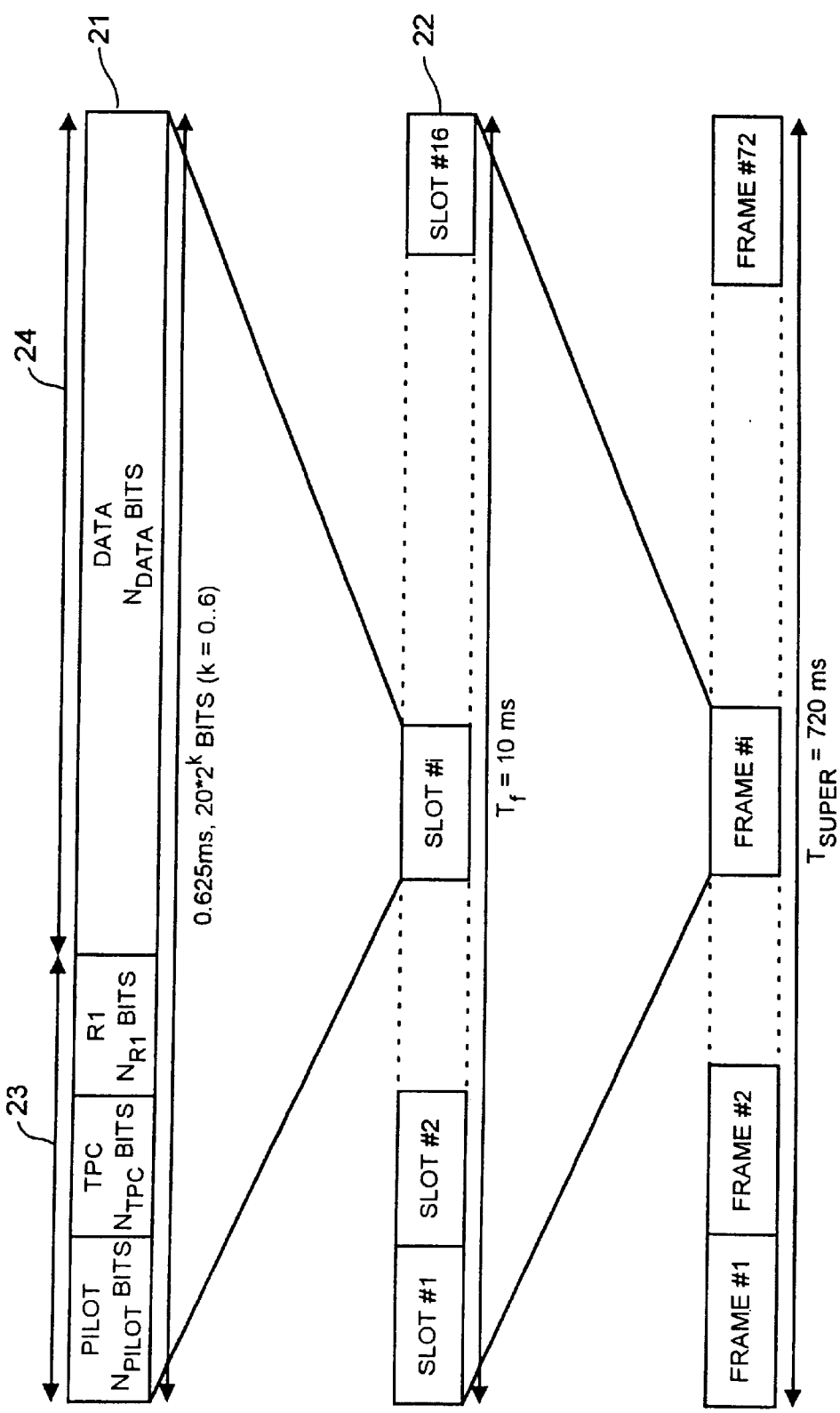
FIG. 4 illustrates the frame structure of a CDMA data channel.

FIG. 4 shows the principle frame structure of the PDCH where the PDCH incorporates the Dedicated Control Channel (DCCH) 23 and the Dedicated Traffic Channel (DTCH) 24. The DCCH is a bidirectional channel used for carrying control information between the network and a radio telephone. The DTCH is a bi-directional or unidirectional channel used for carrying user information between the network and a radio telephone. The PDCH consists of 0.625 ms slots 21 where a frame 22 comprises 16 slots.

When the radio telephone 1 is first powered up it initialises and registers with the network using the SCH to acquire synchronisation to the strongest base station. Once synchronisation has occurred the radio telephone 1 detects the CCPCH, reading the system and cell specific BCCH information. From the BCCH the radio telephone 1 acquires the PRACH codes allowing the radio telephone 1 to place a request with the network to allow the radio telephone to place a call.

In this embodiment base station 8 supports zone b while base station 12 supports zone c. Initially the radiotelephone 1 is powered up in zone b registering, as described above, with base station 8.

After initialisation, the radiotelephone enters idle mode and waits to be paged for an incoming call or for the user to place a call.

If, for example, a user wishes to place a call the radio telephone 1 transmits to the base station 8 a random access message over the PRACH. Before this occurs however, the radio telephone 1 needs to decide what to set the transmit power of the random access message to. The radio telephone 1 achieves this by estimating the uplink path loss from measurements of the received base station power and uses this path loss estimate together with the uplink received interference level and received signal to interference ratio target to decide the transmit power.

Upon reception of the random access message the base station 8 responds with an access grant message on the FACH. If the random access request is for a dedicated channel (e.g. a circuit or packet switched circuit) the access grant message includes a pointer to a dedicated physical channel that can be used. As soon as the radio telephone 1 has moved to the dedicated channel closed loop power control is activated and a data connection is established with the base station 8. In this embodiment the base station 8 creates a communication link with the radio telephone I over channel 3 of FIG. 1 assigning to this communication link a unique spreading code.

Error correction coding is incorporated in the control and data channels. Typically a WCDMA network offers at least two classes of error correction coding. The first class incorporates only convolutional coding. For convolutional coding a data stream is convolved with code generator polynomials in several binary shift-registers. A detailed description of convolutional coding can be found in chapter 8 of 'Digital Communication', by John Proakis. The second class incorporates both Reed-Soloman coding and convolutional coding where Reed-Soloman coding is a type of linear block code. A detailed description of Reed-Soloman coding can be found in chapter 8 of 'Digital Communication' by John Proakis.

Having established a connection between radio telephone 1 and base station 8 as described above it may be necessary, for example if the radio telephone 1 starts to move out of zone b, to perform a handover to another base station. Should the radio telephone 1 move to zone c it will be necessary to perform a handover to base station 12. Otherwise the signal from base station 8 will become too weak to maintain a connection. However, as base station 12 does not operate on the same frequency as channel 3 of base station 8 it will be necessary for radio telephone 1 to perform an inter-frequency measurement to determine the strength of base station's 12 signal while the radio telephone 1 maintains a connection with base station 8.

To determine whether the connection should be switched to another zone the radio telephone's 1 signal measuring means 6c in the transceiver 6 measures the signal strength of the existing connection with base station 8. The signal strength of other zones then need to be measured to determine whether a stronger signal can be received. Typically as the downlink transmission from the base station 8 to the radio telephone 1 will be continuous the inter-frequency measurement will result in the radio telephone 1 not receiving data over the existing connection with base station 8.

When an inter-frequency measurement is to be performed the processor instructs the transceiver to tune to the frequency of another CDMA channel. In this example channel 2 in zone c. The radio telephone 1 obtains a list of possible channels from the BCCH, transmitted over the CCPCH from base station 8.

The inter-frequency measurement rate can be set to a fixed rate (e.g. 1 Hz) or alternatively the rate can be dependent on the measured signal, for example the strength of the signal received in the previous measurement. Thus, if the radio telephone 1 does not detect any other carriers when making an inter-frequency measurement it reduces the rate of the inter-frequency measurement (e.g. to 1 Hz or below). If the radio telephone 1 detects other carriers it increases the measurement rate. However, any suitable means of setting the rate of measurement may be selected.

The duration that the receiver 6b is tuned to another channel will depend on how long the inter-frequency measurement takes and the amount of communication link data that can be recovered using the convolutional coding contained in the received data. In this example 2.5 ms of the 10 ms frame is used to perform the interfrequency measurement (i.e. for 2.5 ms, or 4 slots, of the 10 ms frame the receiver is tuned to another channel and the signal strength of this channel is measured) with a channel coding rate of 1/3.

The maximum time for which the receiver does not receive data from the communication link while still being able to recover the lost data depends on the channel coding rate. Typically the channel coding rate for WCDMA is 1/3. This theoretically allows 2/3 of the bits to be lost while still being able to cover them. In practice however, the maximum allowed loss is typically half the redundancy figure. For example, for 1/3 rate coding 0.5*2/3=33% of the bits could be recovered, for 1/2 rate coding 0.5*1/2=25% of the bits could be recovered. Therefore, it can be seen that theoretically 66% of the data could be lost and still recovered a value of 30% is preferable.

As a result of this measurement 25% of the bits of the frame transmitted by base station 8 will not be received by the radio telephone 1. These bits are recovered using the error correction coding contained in data received by receiver 6b while it is tuned to channel 3 in zone b. A detailed description of how to recover data using error correction data can be found in chapter 8 of 'Digital Communciation', by John Proakis.

However, the loss of 25% of the frame will result in a loss of 1.2 dB of the received overall signal.

$$1.2 \text{ dB} = 10 * \log 10(0.75)$$

Also, part of the coding gain from the convolutional coding will be lost as a result of not receiving 25% of the frame. This will result in a further loss of the order of 0.3 dB. Therefore, there will be an overall reduction of the order of 1.5 dB in signal to interference ratio during the 10 ms frame. This decrease in signal to interference ratio can be compensated for by radio telephone 1 requesting a corresponding increase in power from base station 8.

This request will typically be through power control signalling transmitted in the DCCH. Thus when the radiotelephone 1 needs to perform an inter-frequency measurement it signals to base station 8 to increase signal power. The request will be placed before the inter-frequency measurement is made to allow the radio telephone 1 to obtain sufficient information from the improved signal to allow the missing data to be recovered using the error correction coding. In the above example the 75% of the 10 ms frame that is received should be transmitted with an improved signal to interference ratio of 1.5 dB. This data recovery is based on information contained in one frame. Equally, the power can be increase by a lesser amount but spread over more than one frame. Typically, the radiotelephone 1 signals base station 8 to reduce power either just before or just after the inter-frequency measurement.

If the signal strength of the CDMA channel measured during the inter-frequency measure is greater than the CDMA channel over which the communication link has been established the radiotelephone can request a handover to the new CDMA channel. Otherwise, the connection between the radiotelephone 1 and base station 8 is maintained on the same CDMA channel.

The present invention may include any novel feature or combination of features disclosed herein either explicitly or implicitly or any generalisation thereof irrespective of whether or not it relates to the present claimed invention or mitigates any or all of the problems addressed. In view of the foregoing description it will be evident to a person skilled in the art that various modifications may be made within the scope of the invention. For example, the radio channels having different frequencies may be on different communication networks.

What is claimed is:

1. A radio telephone for communicating in a spreadspectrum communication system having a plurality of radio channels of different frequencies, the radio telephone comprising:
    communication means for establishing over one of said radio channels a communication link over which is communicated data and associated error correction data;
    a receiver operable to alternatively receive for a period a radio channel other than the established channel, wherein the communication means is adapted to requesting increased power from the spreadspectrum communication system at a predetermined interval before the receiver receives the other radio channel; and
    processing means for measuring the radio signal characteristics of the other channel; the processing means being operable to use error correction data received over the established communication link to calculate the contents of the established communication link data of the radio channel signal during the period.

2. A radio telephone according to claim 1 wherein the processing means measures the received signal strength.

3. A radio telephone according to claim 1 wherein the communication means is responsive to a control signal from the processing means for requesting the communication system to increase power a predetermined interval before the receiver receives the other radio channel.

4. A radio telephone according to claim 1 wherein if the signal characteristics of the other radio channel complies with at least one predetermined criterion a communication link over the other radio channel is established.

5. A method of using a radio telephone for measuring a radio channel in a spreadspectrum communication system having a plurality of radio channels of different frequencies; the method comprising:
    establishing a communication link over one of said radio channels over which is communicated data and associated error correction data;
    alternatively receiving for a period a radio channel other than the established channel;
    requesting an increase in power of the established channel at a predetermined interval before receiving the other radio channel; and
    measuring the radio characteristics of the other channel using error correction data received over the established communication link to calculate the contents of the established communication link data of the radio channel signal during the period.

6. A method according to claim 5 wherein the received signal strength is measured.

7. A method according to claim 5 wherein if the signal characteristics of the other radio channel complies with at least one predetermined criterion a communication link over the other radio channel is established.

8. A radio telephone for communicating in a spreadspectrum communication system, the radio telephone comprising:
    a receiver for receiving a first signal including data and error correction information; and
    a processor for requesting an increase in power of the first signal from the communication system before the receiver receives a second signal, the processor being operable for using the error correction information to recover data from the first signal for a time during which the receiver receives the second signal.

9. The radio telephone of claim 8, further comprising a signal measuring device for measuring the signal characteristics of the first and second signals.

10. The radio telephone of claim 9, wherein a handoff to the second signal is performed if the signal characteristics of the second signal comply with a predetermined criteria.

11. The radio telephone of claim 8, wherein a duration of the time during which the receiver receives the second signal is determined from a channel coding rate of the first signal.

12. The radio telephone of claim 8, wherein a duration of the time during which the receiver receives the second signal is determined from a signal loss of the first signal for the duration.

* * * * *